(12) United States Patent
Galestien

(10) Patent No.: US 6,289,595 B1
(45) Date of Patent: Sep. 18, 2001

(54) METHOD AND DEVICE FOR MEASURING WORKPIECES HAVING INTERNAL AND/OR EXTERNAL SCREW THREAD OR SIMILAR GROOVES

(76) Inventor: Reginald Galestien, Veldkampen 2, Oosterhesselen (NL), 7861 BP ( * ) Notice: Subject to any disclaimer, the term of this patent is extended or adjusted under 35 U.S.C. 154(b) by 0 days.

(21) Appl. No.: 09/235,983

(22) Filed: Jan. 22, 1999

(30) Foreign Application Priority Data

Jan. 22, 1998 (NL) .................................................. 1008119

(51) Int. Cl.$^7$ ...................................................... G01B 5/16
(52) U.S. Cl. ........................................... 33/199 R; 33/701
(58) Field of Search ............................... 33/199 B, 199 R, 33/501.7, 542, 548, 552, 701, DIG. 13

(56) References Cited

U.S. PATENT DOCUMENTS

| | | | | |
|---|---|---|---|---|
| 3,047,960 | * | 8/1962 | Mittenbergs | 33/199 R |
| 4,398,351 | * | 8/1983 | Patrick | 33/199 R |
| 4,524,524 | * | 6/1985 | Frank et al. | 33/199 R |
| 4,622,751 | * | 11/1986 | Berg | 33/DIG. 13 |
| 4,947,555 | * | 8/1990 | Allen, III | 33/199 R |
| 5,182,862 | * | 2/1993 | Frank et al. | 33/199 R |
| 5,251,154 | * | 10/1993 | Matsumoto et al. | 33/199 R |

FOREIGN PATENT DOCUMENTS

| | | |
|---|---|---|
| 892136 | 8/1982 | (BE) . |
| 19613173 | 10/1997 | (DE) . |
| 19613175 | 10/1997 | (DE) . |
| 0710815 | 5/1996 | (EP) . |
| 2114746 | 2/1982 | (GB) . |
| 62-027607 | 2/1987 | (JP) . |

\* cited by examiner

*Primary Examiner*—G. Bradley Bennett
(74) *Attorney, Agent, or Firm*—Kinney & Lange, P.A.

(57) ABSTRACT

The invention relates to the determination of the complete two-dimensional axial cross section of internal and external screw threads and similar workpieces, wherein in a plane through the centerline of the workpiece, two screw thread profiles which are located diametrically opposite each other are measured through two two-dimensional scan measurements in this plane or through arithmetic construction based on two profile depth measurements with a measuring ball or measuring wire, further on the basis of the assumption that the screw thread profiles in question further have a known dimension and geometry, whereafter these two opposite profiles are linked to each other by performing one or more linked measurements such as, for instance, the outside diameter in the case of external screw thread and the core diameter in the case of internal screw thread.

Figure 1:
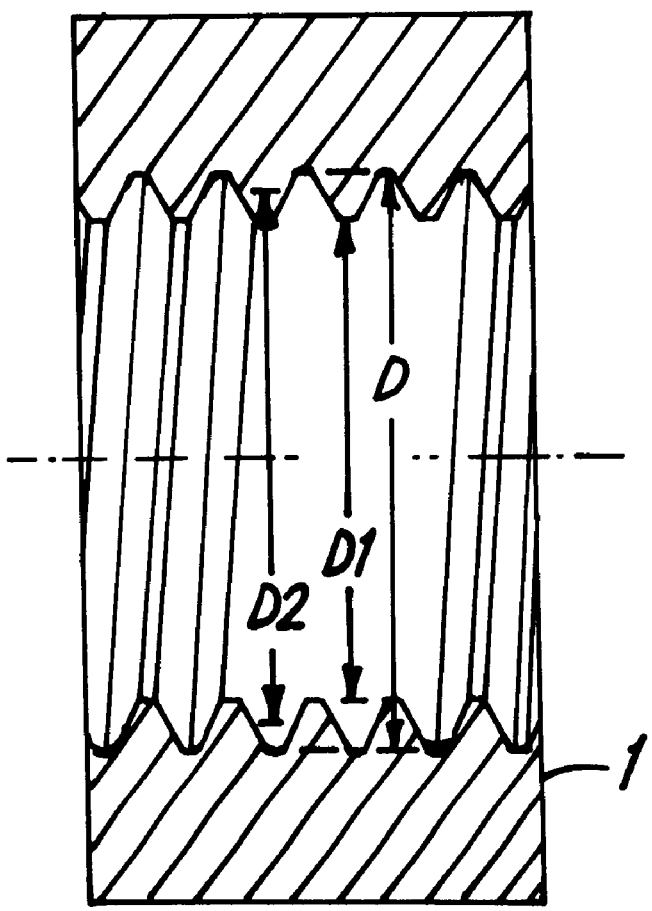

If a proper concentricity of the core diameter, the outside diameter and flank diameter is involved, it may suffice to measure or scan only one profile and one or more linked measurements.

26 Claims, 15 Drawing Sheets

$D2 = X1 + X2 + D1$

MEASUREMENT D1

MEASUREMENT X2

MEASUREMENT X1

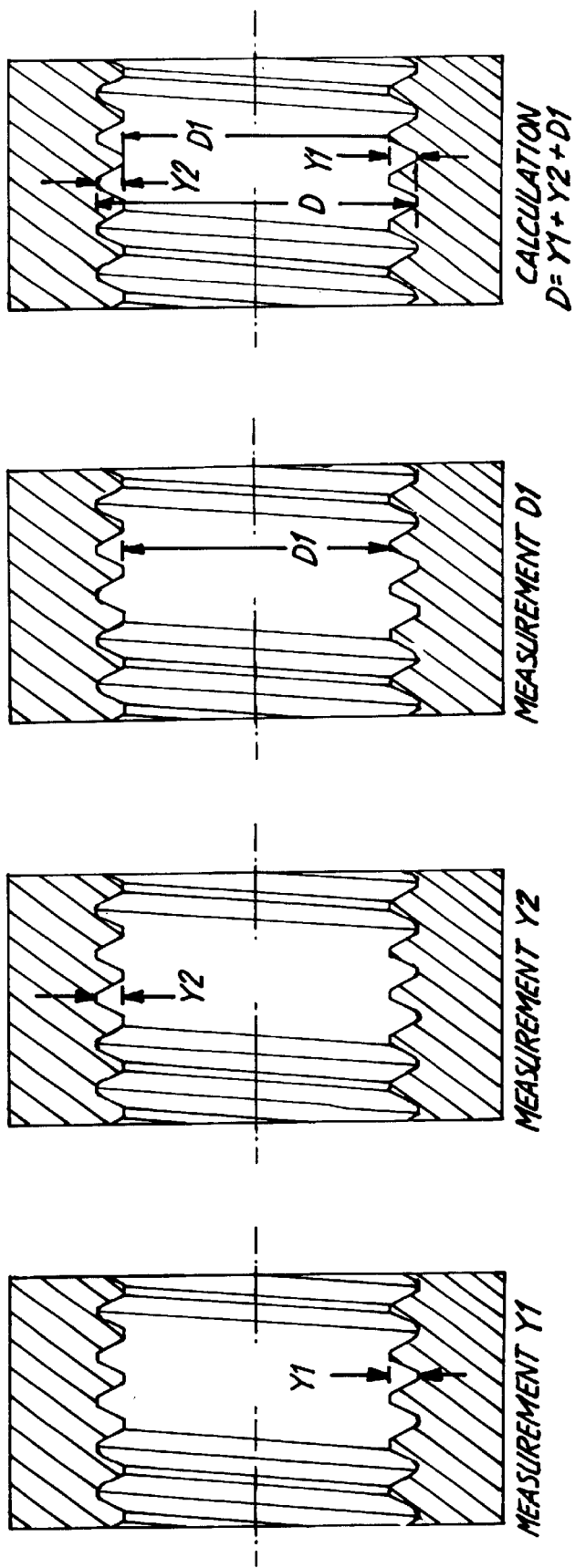

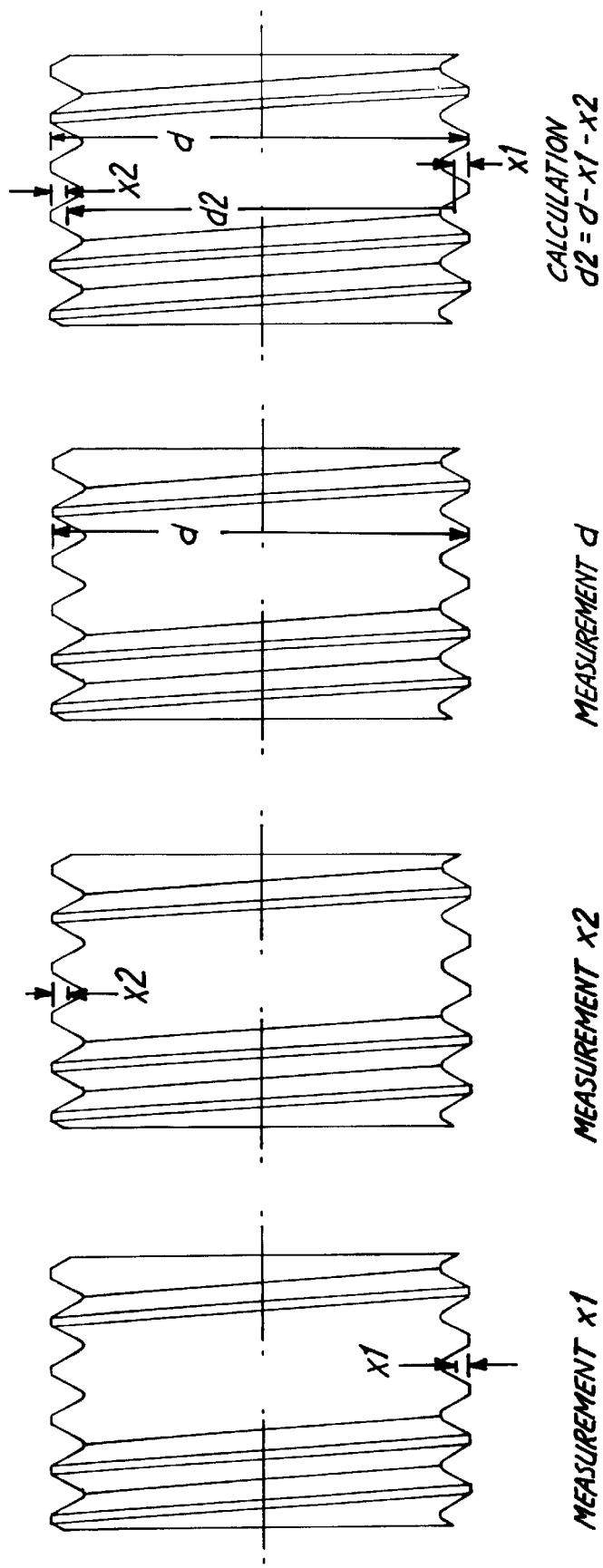

CALCULATION
d2 = d − 2*1

MEASUREMENT d

MEASUREMENT X1

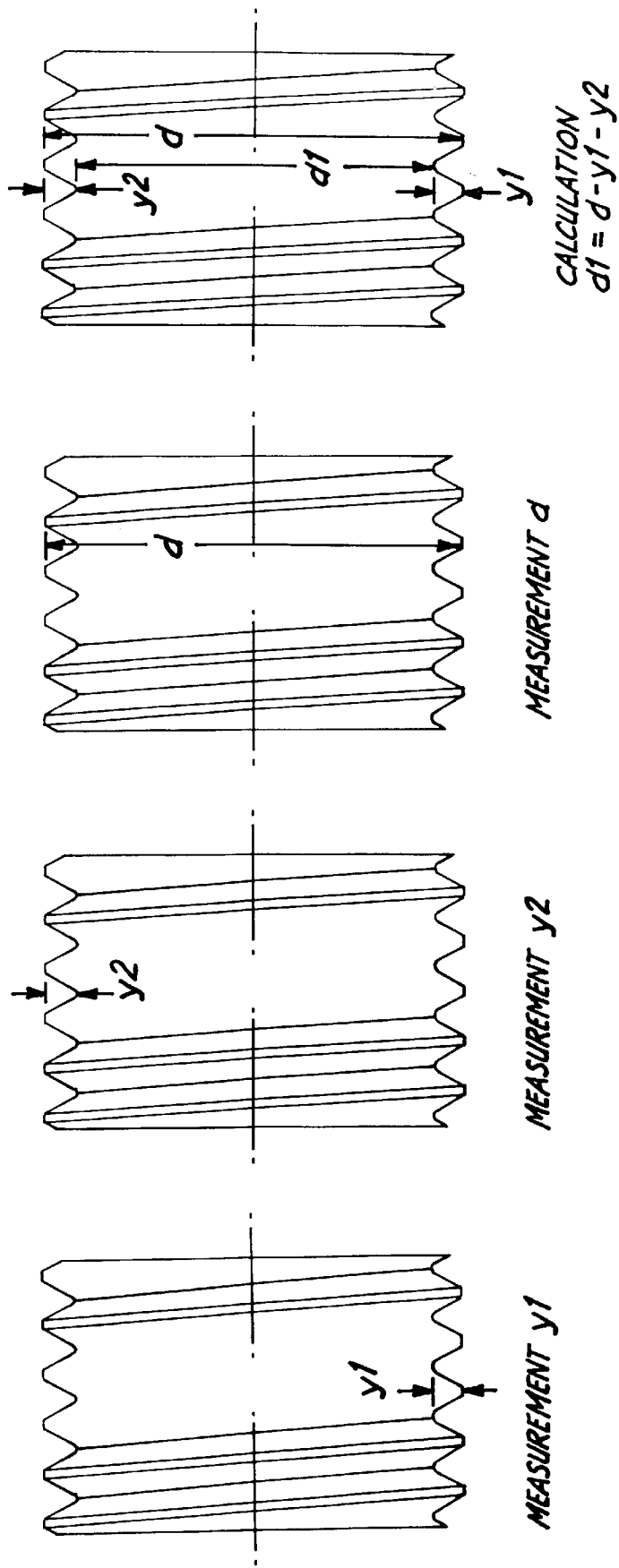

MEASUREMENT m

MEASUREMENT m

METHOD AND DEVICE FOR MEASURING WORKPIECES HAVING INTERNAL AND/OR EXTERNAL SCREW THREAD OR SIMILAR GROOVES

This invention relates to determining a two-dimensional axial cross section of internal and external screw threads and similar workpieces, with a view to deriving therefrom screw thread quantities such as flank diameter.

There are methods known, in which such complete axial cross section can be determined in a single cycle with a single measuring instrument, or with which the flank diameter can be determined in a single cycle.

Such a method for determining geometric parameters of screw thread is known, for instance, from BP 0 589 500. The measuring results obtained by that method are highly accurate and hence suitable in particular for performing measurements on, for instance, reference screw threads or screw thread gauges.

A disadvantage of this known method, however, is that the required measuring device is complicated, sizeable and costly. Also, a measurement lasts relatively long. Owing to its large size, the known measuring device is not mobile, so that the object to be measured must be brought to the measuring device, which entails additional loss of time. further, the known measuring device is not suitable for the in situ measurement of objects, in particular products fixed in a processing machine. Consequently, it is not possible to perform a measurement during production without removing the object from the processing machine. When a form deficiency has been established, it is subsequently not possible anymore to remedy it by a supplementary processing operation, because the original fixture has been lost. In addition, for many applications, measurements of a calibration accuracy are not required, so that the application of a highly accurate but expensive measuring device is not economically feasible.

A method as described above is further known from DE 198 13 175. The method described there, too, has the above-mentioned associated disadvantages. In addition, this method is hardly applicable for measuring internal screw thread, Accordingly, there is a need for a method for determining geometric parameters of internal and external screw thread, which, while maintaining a good accuracy, can yet be carried out fast, at low cost and in situ, The object of the invention is to provide a method which meets this need. To that end, according to the invention, a method for determining a geometric parameter of screw thread is characterized in that separately two screw thread profiles which are located diametrically opposite each other and which are both located in a plane through the centerline of the screw thread are scanned, and the scanned profiles are subsequently linked with each other using at least one linked measurement of a suitable intermediate parameter such as, for instance, the core diameter in the case of internal thread or the outside diameter in the case of external thread.

Another object of the invention is to provide a measuring device that may be made of portable design, for measuring screw thread in situ. To that end, according to the invention, a scanning device is provided for scanning a screw thread profile, comprising a housing and a measuring arm at one end fitted with a scanning or probe element and at the other end pivotally connected with the housing, and further comprising detection means for determining a deflection of the probe element.

By splitting the known single measurement into a plurality of simpler measurements, the measuring equipment can likewise be split up into a compact profile depth measuring instrument or a profile scan measuring instrument and a measuring instrument for measuring the outside diameter of external screw thread, such as sliding calipers or an outside screw gauge, or a measuring instrument for measuring the core diameter of internal screw thread, such as sliding calipers or an inside screw gauge.

As a result of this split of the measuring process into subprocesses in conformity with the disclosure of this invention, the instrumentation can be made of highly compact and even portable construction, yielding the advantage that screw thread of products can be checked during production while the workpiece is still fixed on the processing machine and hence it is still possible, if necessary, to incorporate corrections into the screw thread machining process. Rejection can thus be prevented.

If the profiles are scanned, the actual dimension and geometry of the screw thread profile are determined and the actual values of the pitch, flank sub-angles and profile angle can be computed and a graphic presentation of the cross section can be presented even in combination with a graphic presentation of the minimum and maximum material tolerance zones.

The qualification of a complex screw thread geometry of a workpiece is thereby greatly simplified.

A further simplification of the invention can be obtained by performing, instead of a profile scan step, a profile depth measurement, for instance using the two-ball method, known per se, or (for external screw thread) the measuring wire method, known per se.

Figure 6:
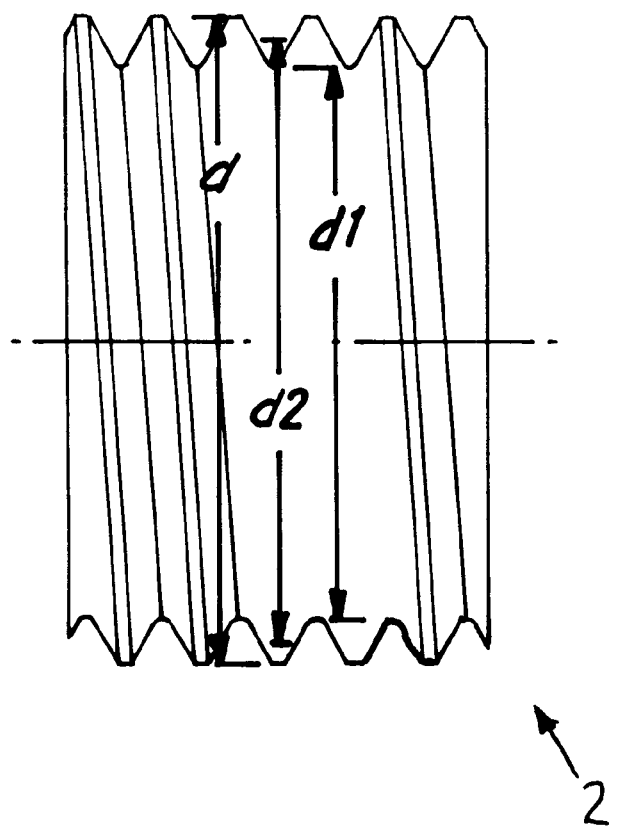
Figure 11:
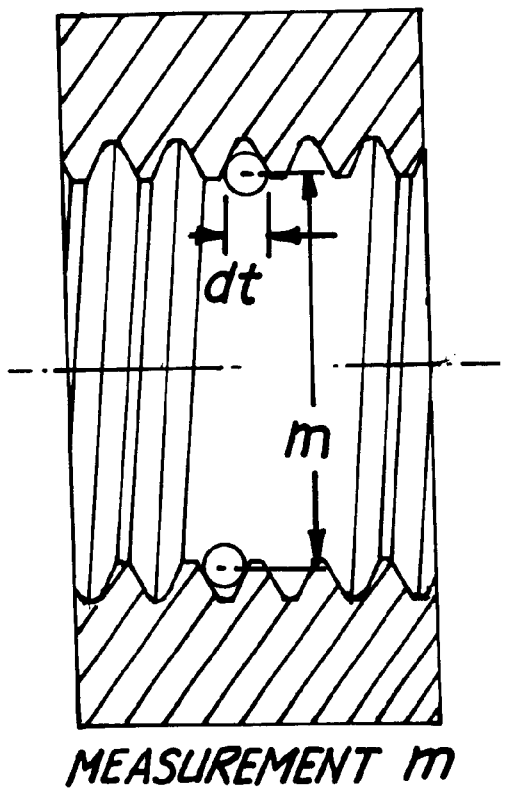
Figure 12:
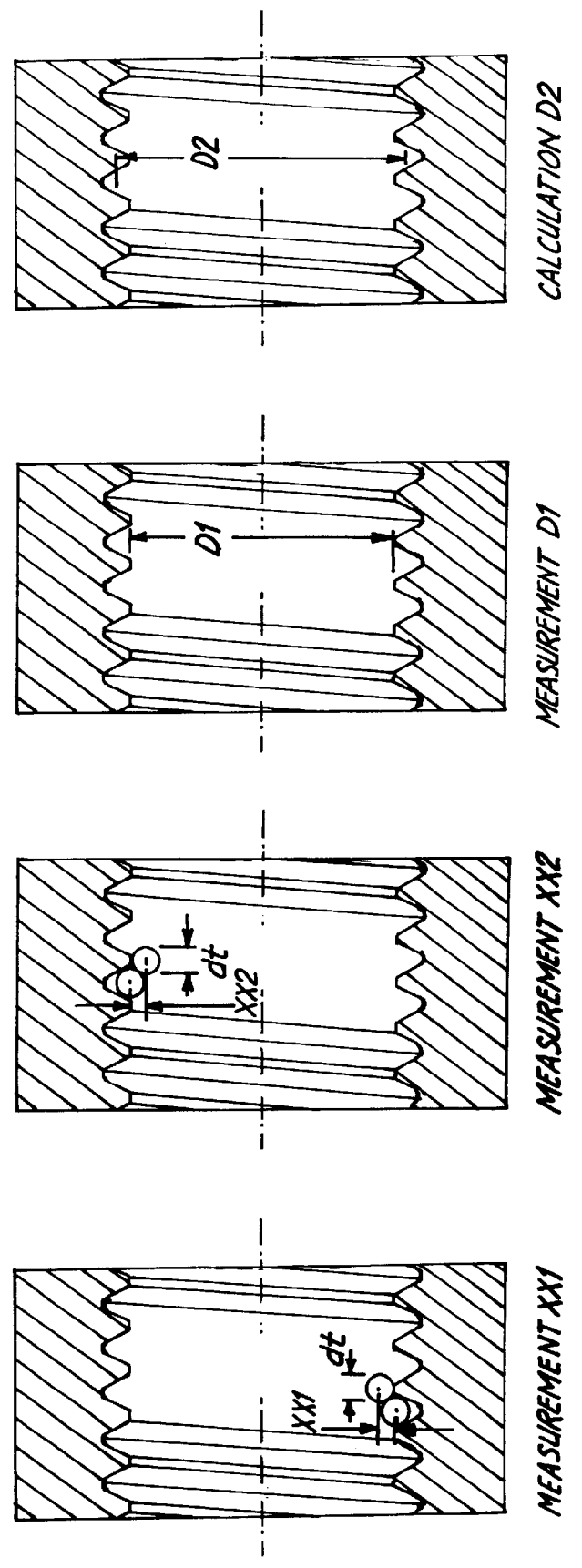
Figure 13:
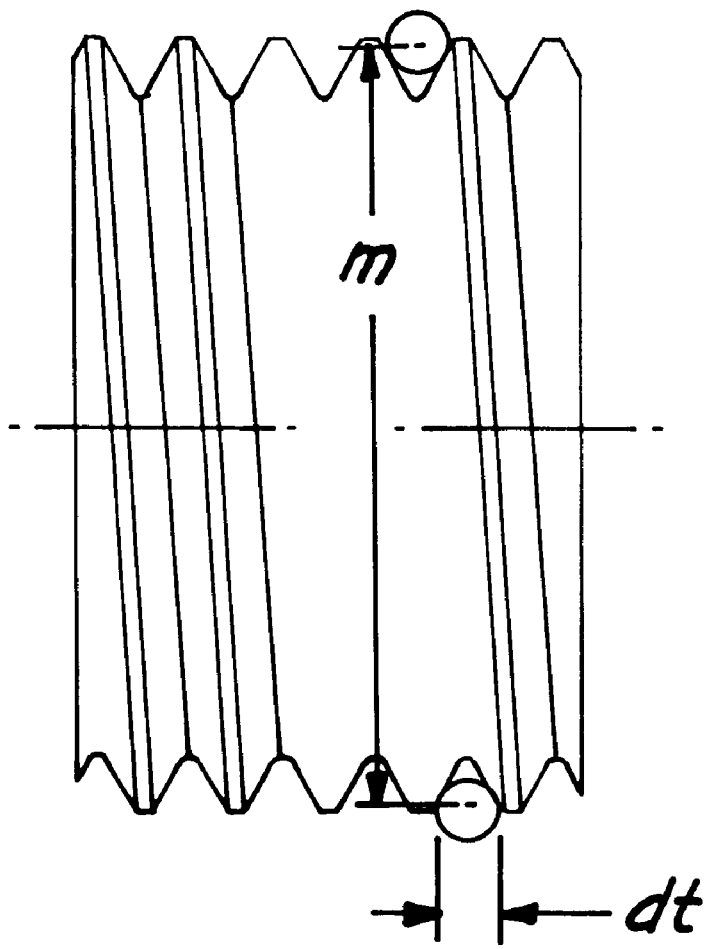
Figure 14:
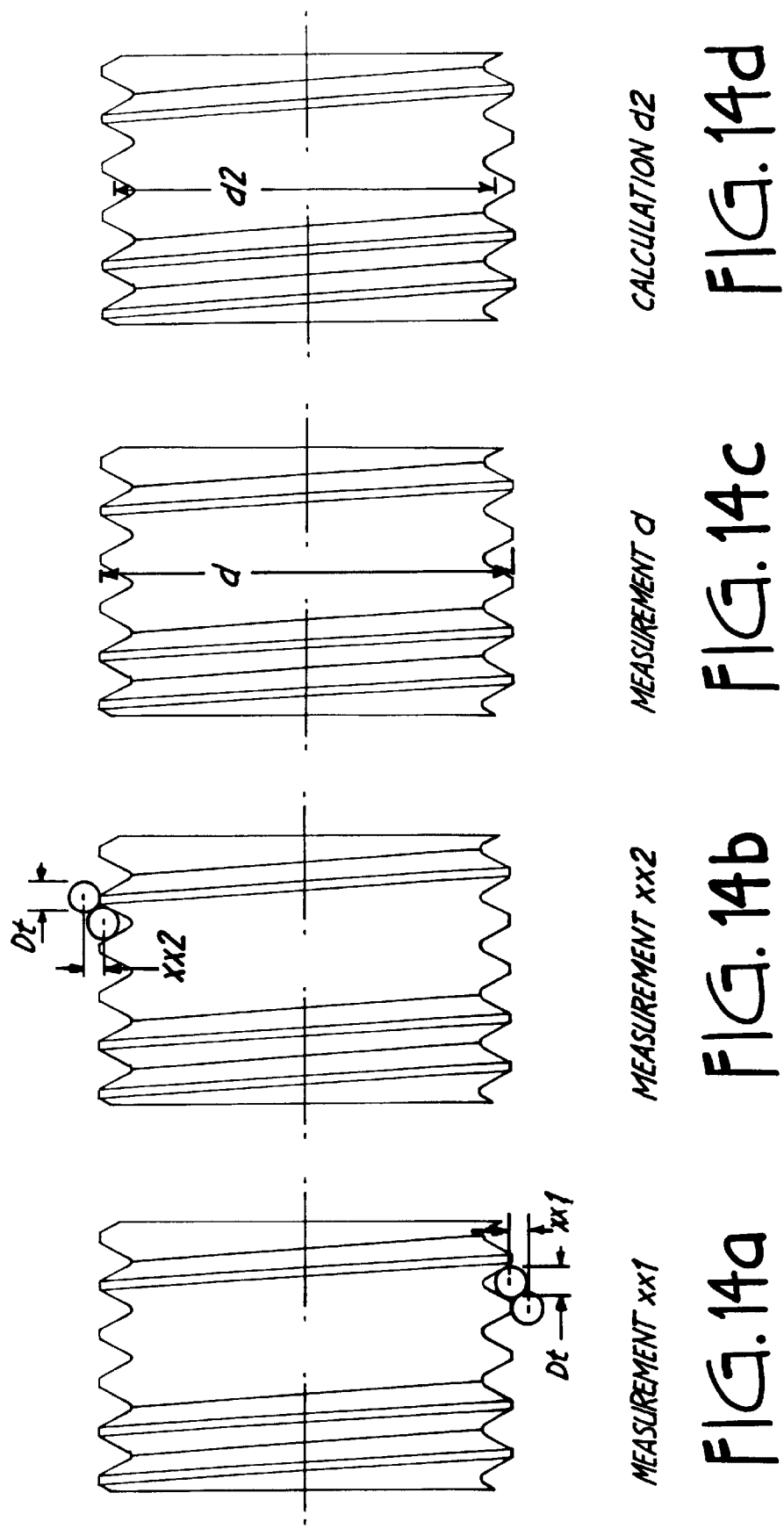
Figure 15:
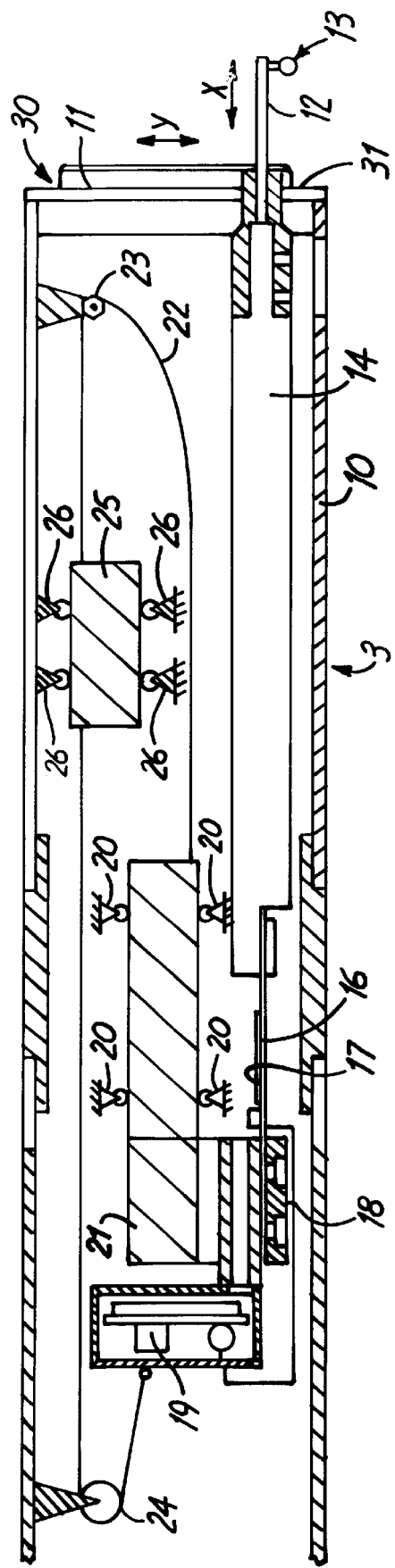

Hereinbelow, the invention will be further elucidated with reference to the accompanying drawings, FIG. 1 schematically shows in longitudinal cross section an example of a workpiece provided with internal screw thread;

FIG. 2 schematically illustrates an example of a method according to the invention for determining the flank diameter of an internal screw thread;

FIG. 3 illustrates a variant of the method of FIG. 2;

FIG. 4 schematically illustrates an example of a method according to the invention for determining the outside diameter of an internal screw thread;

FIG. 5 schematically illustrates a variant of the method of FIG. 4;

FIG. 6 schematically shows an example of a workpiece provided with external screw thread;

FIG. 7 schematically illustrates an example of a method according to the invention for determining the flank diameter of an external screw thread;

FIG. 8 schematically illustrates a variant of the method of FIG. 7;

FIG. 9 schematically illustrates an example of a method according to the invention for determining the core diameter of an external screw thread;

FIG. 10 schematically illustrates a variant of the method of FIG. 9;

FIG. 11 schematically illustrates the known two-ball method for measuring internal screw thread;

FIG. 12 schematically illustrates an example of a method according to the invention for determining the flank diameter of internal screw thread via a profile depth measurement;

FIGS. 13 and 14 schematically illustrate an example of a method according to the invention for determining the flank diameter of external screw thread via a profile depth measurement;

FIG. 15 schematically shows a partial cross section of a measuring instrument according to the invention.

FIG. 1 schematically shows an example of a workpiece 1 provided with internal screw thread. The screw thread has an inside diameter D1, an outside diameter D and a flank diameter D2. The flank diameter is the diameter of an imaginary cylindrical plane which intersects the screw thread such that the cylindrical plane intersects as much air as solid material.

FIG. 6 schematically shows in a similar manner a workpiece 2 provided with external screw thread. The external screw thread has an outer diameter d, a core diameter d1 and a flank diameter d2.

Known scanning methods are disclosed in DE-A 3 217 595 (MAUSER-WERKE) and in DE-A-3 023 607 (HYDRIL CO.) and US-E-30 647 (T. L. BLOSE), all starting from a spiral scan in a single measuring process, in which, however, the axial screw thread profile is not scanned entirely.

Further, various axial profile scanning methods are known. For accurately scanning complete axial screw thread profiles, optimum correction of the scanning probe form deficiencies is necessary.

Scanning methods and probe correction methods that have good applicability here are disclosed in patent specification EP-A 0,89,500 (GALESTIEN, IR, R).

Accordingly, although determining an axial profile scan is known per se, it is in accordance with the invention that a single complex double-sided scanning process is divided up into several simpler measuring processes which are coupled to each other, enabling the equipment to be made of simpler, more compact, more robust and portable construction, while yet, through a complete axial profile scan, information is made available about the pitch, flank angles and profile accuracy.

Figure 2D:
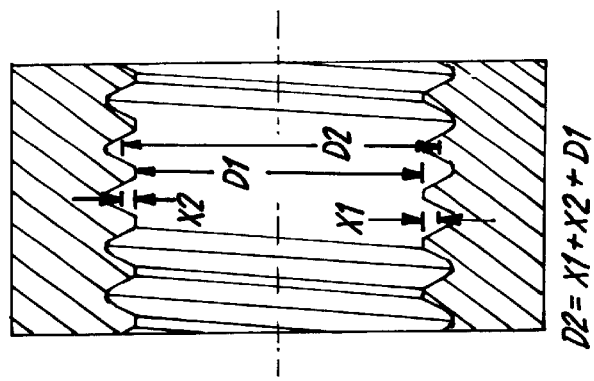
Figure 2C:
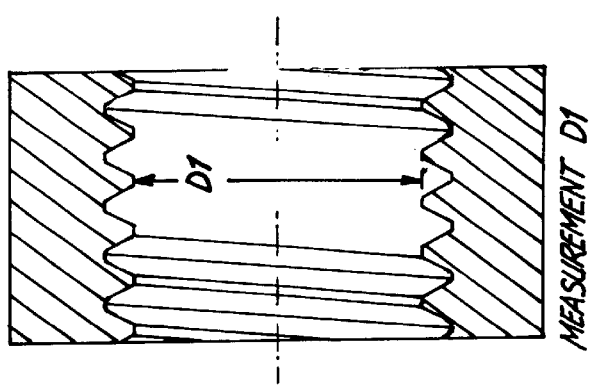
Figure 2B:
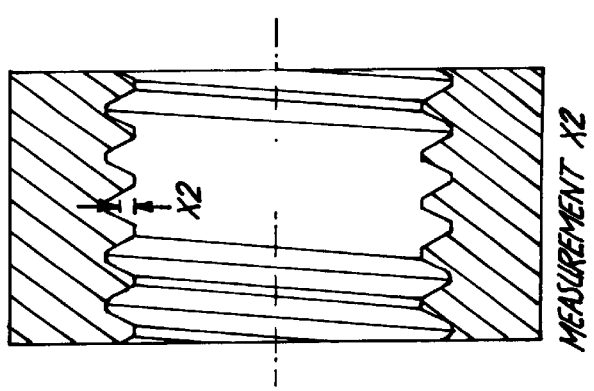
Figure 2A:
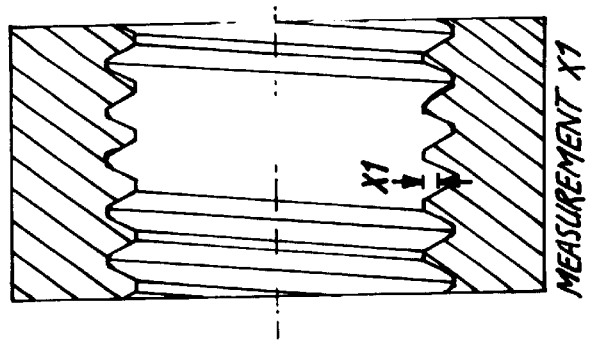
Figure 3A:
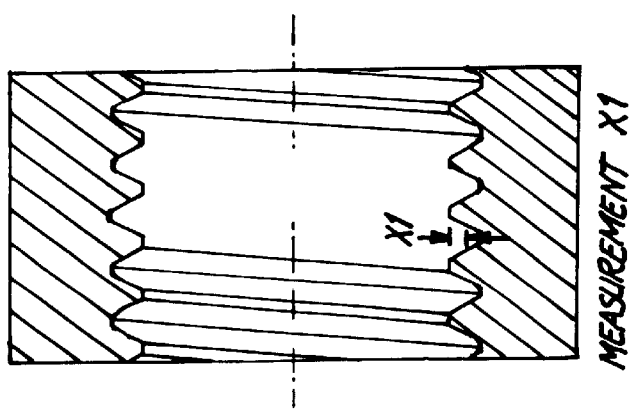
Figure 3B:
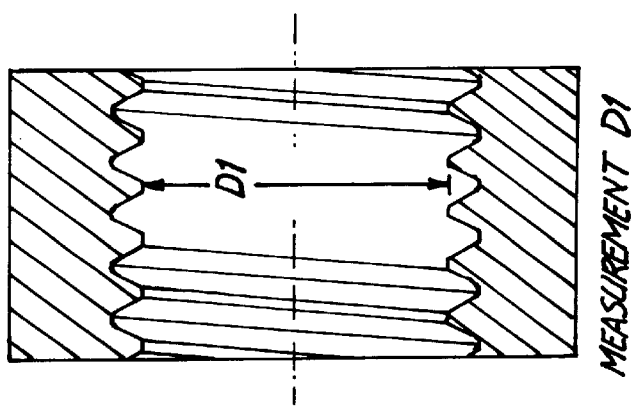

The measurement of the flank diameter D2 of internal screw thread, according to the improved new method, is based on;

1) scanning the screw thread in an axial plane through the centerline of the screw thread over at least one complete thread (see FIG. 2a);
2) determining from the scanning result the position X1 in the profile where the profile is intersected by a line parallel to the reference axis of the profile, with 50% material and 50% air;
3) scanning the diametrically opposite screw thread in an axial plane over at least one complete thread (see FIG. 2b);
4) determining from the scanning result the position X2 in the profile where the profile is intersected by a line parallel to the reference axis of the profile, with 50% material and 50% air;
5) measuring the core diameter D1 of the screw thread in at least one position using an inside measuring instrument such as sliding calipers or an inside screw gauge (see FIG. 2c);
6) computing the flank diameter D2 using the formula $D2=X1+X2+D1$ (see FIG. 2d).

Figure 3C:
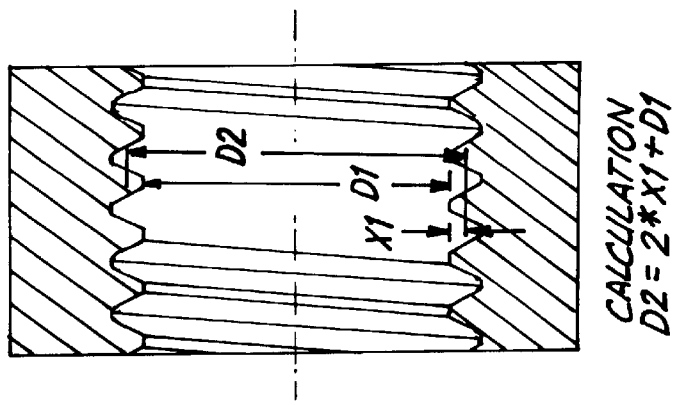

If proper concentric machining is involved, the determination of the flank diameter D2 can be shortened, in accordance with the new method, to:

1) scanning the screw thread in an axial plane through the centerline of the internal screw thread over at least one complete thread (see FIG. 3a);
2) determining from the scanning result the position X1 in the profile where the profile is intersected by a line parallel to the reference axis of the profile, with 50% material and 50% air:
3) measuring the core diameter D1 of the screw thread in at least one position using an inside measuring instrument such as sliding calipers or an inside screw gauge (see FIG. 3b);
4) computing the flank diameter D2 using the formula $D2=2.X1+D1$ (see FIG. 3c).

The measurement of the outside diameter D of internal scraw thread, according to the improved new method, is based on:

1) scanning the screw thread in an axial plane through the centerline of the screw thread over at least one complete thread (see FIG. 4a);
2) determining from the scanning result the position Y1 in the profile where the profile is intersected by a line parallel to the reference axis of the profile, with precisely 100% material and 0% air;
3) scanning the diametrically opposite screw thread in an axial plane over at least one complete thread (see FIG. 4b);
4) determining the position Y2 in the profile where the profile is intersected by a line parallel to the reference axis of the profile, with precisely 100% material and 0% air;
5) measuring the core diameter D1 of the screw thread in at least one position using an inside measuring instrument such as sliding calipers or an inside screw gauge (see FIG. 4c);
6) computing the outside diameter D using the formula $D=Y1+Y2+D1$ (see FIG. 4d).

Figure 5C:
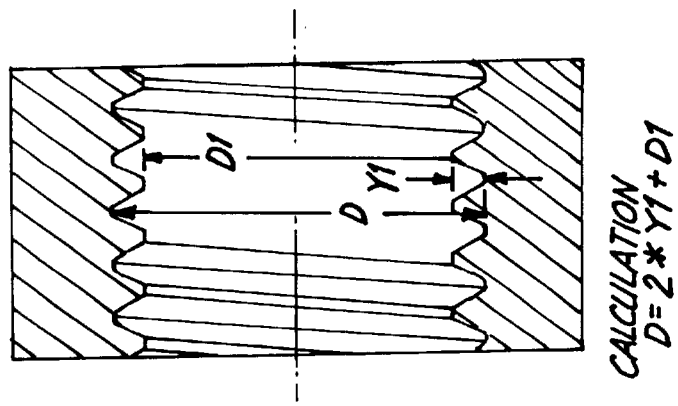
Figure 5B:
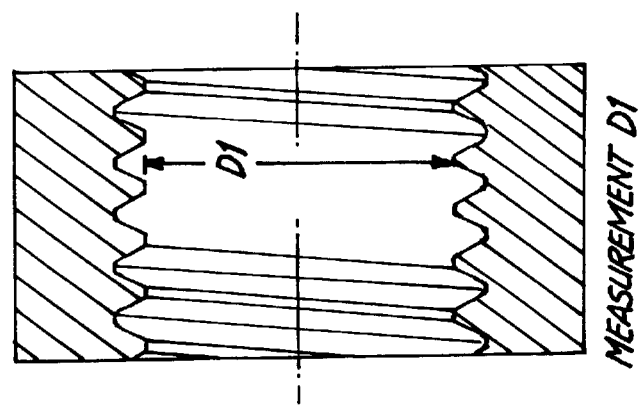
Figure 5A:
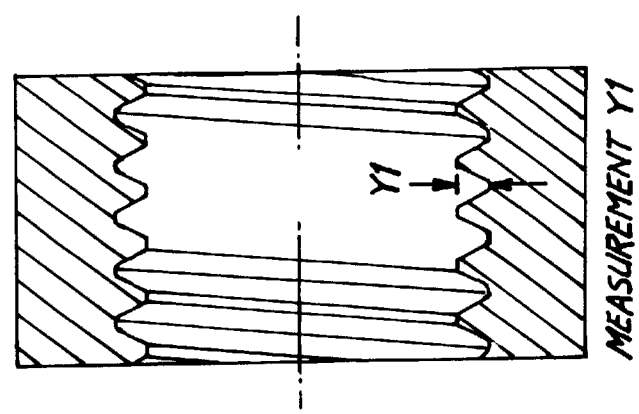

If, as before, properly concentric machining is involved, the determination of the outside diameter D can be shortened, in accordance with the new method, to:

1) scanning the screw thread in an axial plane through the centerline of the screw thread over at least one complete thread (see FIG. 5a),
2) determining from the scanning result the position Y1 in the profile where the profile is intersected by a line parallel to the reference axis of the profile, with precisely 100l material and 0% air;
3) measuring the core diameter D1 of the screw thread in at least one position using an inside measuring instrument such as sliding calipers or an inside screw gauge (see FIG. 5b);
4) computing the outside diameter D using the formula $D2=2.Y1+D1$ (see FIG. 5c).

Obviously, it is possible in these scanning methods to calculate, in the case of internal screw thread, the flank diameter and the outside diameter simultaneously.

The measurement of the flank diameter d2 of external screw thread as shown in FIG. 6, according to the improved new method, is based on:

1) scanning the screw thread in an axial plane through the centerline of the screw thread over at least one complete thread (see FIG. 7a);
2) determining from the scanning result the position x1 in the profile where the profile is intersected by a line parallel to the reference axis of the profile, with 50% material and 50% air;
3) scanning the diametrically opposite screw thread in an axial plane over at least one complete thread (see FIG. 7b);
4) determining from the scanning result the position x2 in the profile where the profile is intersected by a line parallel to the reference axis of the profile, with 50% material and 50% air;

5) measuring the outside diameter d of the screw thread in at least one position using an inside measuring instrument such as sliding calipers or an inside screw gauge (see FIG. 7c);
6) computing the flank diameter d2 using the formula d2=d−x1−x2 (see FIG. 7d).

Figure 8C:
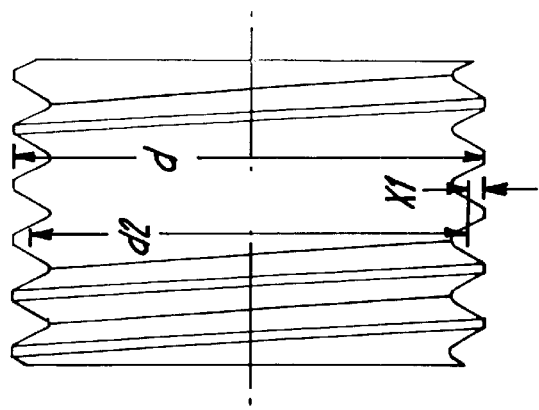
Figure 8B:
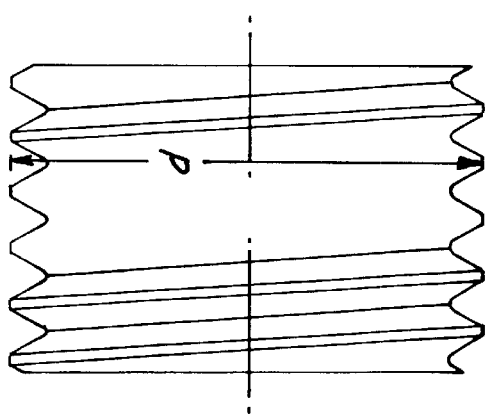
Figure 8A:
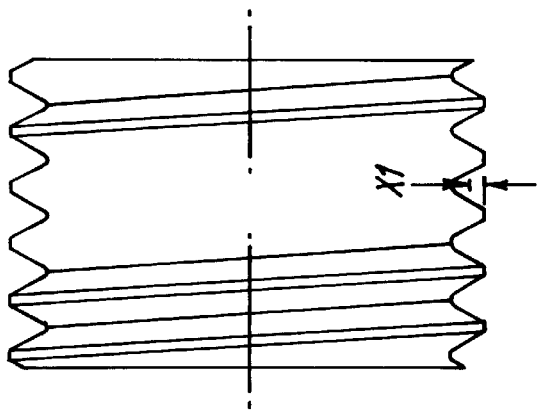

If a proper concentric machining is involved, the determination of the flank diameter d2 can be shortened, in accordance with the new method, to:

1) scanning the screw thread in an axial plane through the centerline of the screw thread over at least one complete thread (see FIG. 8a);
2) determining from the scanning result the position x1 in the profile where the profile is intersected by a line parallel to the reference axis of the profile, with 50% material and 50% air;
3) measuring the outside diameter d of the screw thread in at least one position using an outside measuring instrument such as sliding calipers or an outside thread gauge (see FIG. 8b);
4) computing the flank diameter d2 using the formula d2=d−2.x1 (see FIG. 8c).

The measurement of the core diameter d1 of external screw thread, according to the improved new method, is based on:

1) scanning the screw thread in an axial plane through the centerline of the screw thread over at least one complete thread (see FIG. 9a);
2) determining from the scanning result the position y1 in the profile where the profile is intersected by a line parallel to the reference axis of the profile, with precisely 100% material and 0% air;
3) scanning the diametrically opposite screw thread in an axial plane over at least one complete thread (see FIG. 9b);
4) determining from the scanning result the position y2 in the profile where the profile is intersected by a line parallel to the reference axis of the profile, with precisely 100% material and 0% air;
5) measuring the outside diameter d of the screw thread in at least one position using an external measuring instrument such as sliding calipers or an external thread gauge (see FIG. 9c);
6) computing the core diameter di using the formula d1=d−y1−y2 (see FIG. 9d).

Figure 10C:
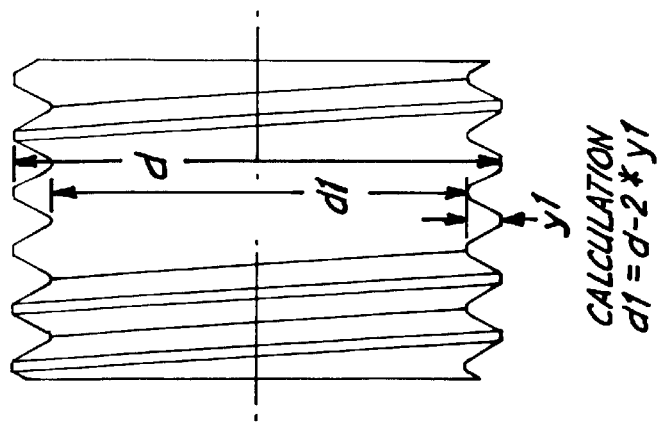
Figure 10B:
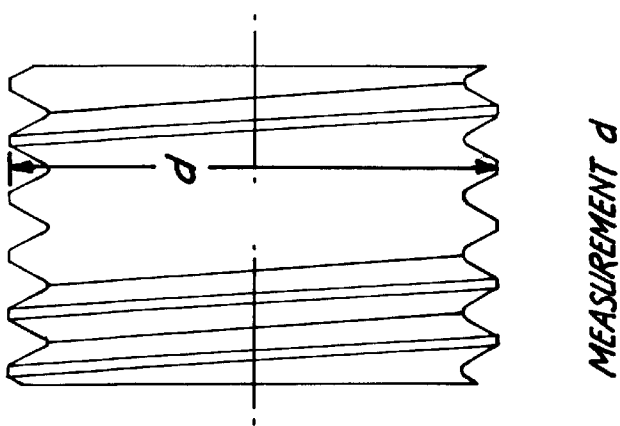
Figure 10A:
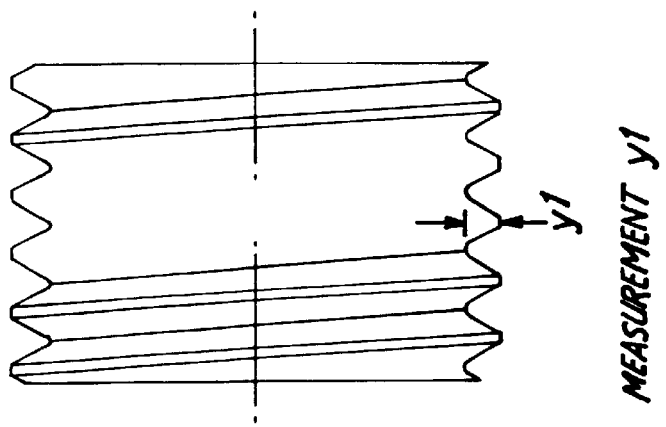

If, as before, proper concentric machining is involved, the determination of the core diameter d1 can be shortened in accordance with the new method, to:

1) scanning the screw thread in an axial plane through the centerline of the screw thread over at least one complete thread (see FIG. 10a);
2) determining from the scanning result the position y1 in the profile where the profile is intersected by a line parallel to the reference axis of the profile, with precisely 100% material and 0% air;
3) measuring the outside diameter d of the screw thread in at least one position using an outside measuring instrument such as sliding calipers or an outside screw gauge (see FIG. 10b);
4) computing the core diameter d1 using the formula d1=d−2.y1 (see FIG. 10c).

Obviously, it is possible in these scanning methods to calculate, in external screw thread, the flank diameter and the core diameter simultaneously.

According to a further elaboration of the concept of the invention, a simplification of the above-described methods is enabled if the scanning of at least one period of the screw thread profile with a scanning instrument on one side or at two diametrically opposite positions is replaced with a simple profile depth measurement.

A known screw thread measuring method for checking internally threaded workpieces in the workshop environment utilizes the two-ball method for internal thread (see FIG. 11), in which, with an instrument, the distance m between the ball centers is measured.

If it assumed that, for instance, the values of the period or pitch and the flank angles are known and that the geometry of the screw thread profiles is mathematically ideal, the flank diameter can be calculated with known formulae, such as those according to Berndt (3, 4 and 5). See formulae sheet I.

By making use, as an alternative to the scanning of :he screw thread profiles, of profile depth measurements for internal screw thread (see FIGS. 12a, 12b), the instrumentation and the operation thereof become simpler.

The profile depths XX1 and XX2 are measured after each other with the profile depth measuring instrument which comprises a measuring ball of a suitable diameter dt, which engages approximately the middle of the flanks.

Next, the linked measurement of the core diameter D1 is measured with an inside measuring instrument such as sliding calipers or an inside thread gauge (see FIG. 12c).

Next, the distance m between the centers of the two measuring ball positions can be calculated with the formula (1) and the flank diameter can be determined with, for instance, the known formulae of Berndt (3, 4 and 5), while the values for the pitch, the flank angles and the profile accuracy have to be assumed. These can be, for instance, the nominal values.

If it may be assumed that the core diameter, flank diameter and outside diameter have been manufactured with proper concentricity, it can suffice to measure only the profile depth XX1 and it may be stated that XX2 equals XX1. The calculation of m is then performed with formula (2) and the calculation of the flank diameter with the formulae (3, 4 and 5).

A known screw thread measuring method for checking externally threaded workpieces in the workshop environment utilizes the measuring wire method or measuring ball method for external thread (see FIG. 13), in which, with an instrument, the distance m between the centers is measured.

Such a method is disclosed in GB 556,343 (COOKE, TROUGHTON & SIMMS).

If it assumed that, for instance, the values of the period and the flank angles are known and that the geometry of the profile is mathematically ideal, the flank diameter can be calculated with known formulae, such as those according to Berndt (8, 9 and 10). See formulae sheet II.

By making use, as an alternative to the scanning o0 screw thread profiles, of a profile depth measurement for external screw thread (see FIGS. 14a, 14b), the instrumentation and the operation thereof become simpler and more compact.

The profile depths xx1 and xx2 are measured after each other with the profile depth measuring instrument, which comprises a measuring wire or measuring ball of a suitable diameter dt, which engages approximately the middle of the flanks. Next, the linked measurement of the outside diameter d is measured with an outside measuring instrument, such as sliding calipers or an outside thread gauge (see FIG. 14c).

Next, the distance m between the centers of the two measuring ball positions or measuring wire positions can be calculated with the formula (6) and the flank diameter can be determined with, for instance, the known formulae of Berndt (8, 9 and 10), while the values for the pitch, the flank angles and the profile form accuracy have to be assumed.

If it may be assumed that the core diameter, flank diameter and outside diameter have been manufactured with proper concentricity, it can suffice to measure only the profile depth xx1 and it may be stated that xx2 equals xx1.

The calculation of m is then performed with formula (7).

Over against the advantage that the depth measuring instrument can be built simply and compactly as a one-dimensional instrument, there is the disadvantage that the dimensions and the geometry of the screw thread profiles are not measured and have to be assumed, so that the value of, for instance, the flank diameter can be calculated with less certainty.

It is also less certain whether internal and external screw threads which have been checked according to the simpler method based on profile depth measurement will in fact fit. In a number of practical situations, this drawback is not critical. If this drawback is critical, however, the method according to the invention as described earlier, which is based on a (partial) profile scan, can be utilized.

In the following, by way of example, an exemplary embodiment of a measuring instrument according to the invention is described, with reference to FIG. 15.

The measuring instrument 3 is constructed as an elongate instrument, which may optionally be provided with a pistol handle (not shown). In this example, the instrument 3 comprises a cylindrical housing 10. At the front, the housing 10 is provided with a lid 11, with an opening through which reaches a scanning or probe element 12. The probe element 12 at one end comprises a probe member, in this example designed as a ball 13. At the other end, the probe element 12 is detachably connected to an end of an elongate arm 14. The other end of the arm 14 is connected with a resilient element in the form of a leaf spring 16. This leaf spring 16 is connected with base element 18, such that the arm 14 can swing relative to the base element 18. Provided on the leaf spring are strain gauges 17, which are electrically connected with an amplifier 19. Upon deflection of the probe element 12, and hence the arm 14, in the direction indicated by Y in FIG. 15, the leaf spring 16 bends, whereby the strain gauges 17 generate an electrical signal which is received by the amplifier 19. On the basis of the signal produced by the strain gauges 17, the extent of deflection of the probe element 12 in the Y-direction, i.e. transverse to the longitudinal direction of the probe element, can be determined. Leaf spring, strain gauges and measuring arm with associated housing can advantageously be constructed as a one-dimensional measuring transducer unit. Such a measuring transducer has other applications as well, for instance in an x-y table.

According to the invention, the probe element 12 may also comprise other elements, instead of a ball 13, such as, for instance, a cylindrical element or wire.

In this embodiment, the signal is amplified by the amplifier 19 and then, via an electrical connection (not shown), transmitted to a processing device, such as, for instance, a (micro)processor comprising analog-digital converters. For that matter, the invention is not limited to this mode of signal and information transfer; other suitable modes are also applicable. Thus, the instrument 3 may comprise a small computing device which converts the signal obtained via the amplifier 19 into digital information and then transmits this information via a data link to a processing device. Such a data link could be implemented, for instance, via a cable with an input port of a personal computer, which may or may not be portable, or a control computer of an implement, such as a turning lathe. Such a data link may also be established, for instance, via a transmitter, such as an infrared transmitter.

The base element 18 is mounted on a subframe 21 which, by means of rollers 20 arranged in the housing, can slide axially relative to the housing 10. Further, the subframe 21 is connected through a cord 22 and wheels 23 and 24 with a counterweight 25 which has substantially the same mass as the subframe 21 with the complete probe arm. This counterweight 25 is likewise mounted for sliding movement relative to the housing, by means of rollers 26 mounted in the housing. Upon movement of the subframe 21 and the probe arm connected thereto, the counterweight 25 is moved, by way of the cord 22 and the wheels 23 and 24, in the opposite direction, so that the movement of the subframe 21 is compensated virtually entirely. The counterweight construction represented in FIG. 15 is represented highly schematically; such counterweight constructions, however, are known from practice, so that, for brevity's sake, a detailed description is omitted.

By virtue of the counterweight construction, the instrument can be used in a vertical position without any problems; the assembly of subframe 21 and probe arm is urged downwards by gravity, but this force is compensated by the counteracting gravitational force exerted on the counterweight 25, so that the probe arm, on balance, is in a neutral position.

Although probe element 12 is constructed with a counterweight compensation for vertical measurements, this is not requisite. For certain applications, for instance where measuring occurs only horizontally, this facility can be omitted. According to the invention, it is also possible to make the measuring device suitable for use in various positions through other compensation means.

The whole of the scanning probe arm fitted on the base element 18 is slidably mounted in the housing 10, so that the probe element 12 can perform a movement in the X-direction, i.e., in the longitudinal direction of the probe element. To that end, the measuring arm 14 is connected through a leaf spring to a straight guide arranged in the housing. During scanning, the ball 13, in the case of a descending screw thread flank, is urged to the deepest point of the groove, while, conversely, in the case of an ascending screw thread flank, the ball 13 is decelerated as it ascends the flank. What is thus achieved is that the ball 13, as it follows the screw thread profile, engages the deepest portions of the screw thread for longer periods. This ensures that the measurement of this position always takes place.

If the device is not provided with a counterweight construction as described hereinbefore, the subframe 21 can be differently mounted so as to be slidable relative to the housing, for instance through a spring suspension.

Although in this example the angular displacement of the arm 14 as a result of the displacement of the probe element 12 is determined, the invention is not limited thereto; other ways of determining the displacement of the probe element can be used as well. Further, it is preferred that the displacement of the probe element in the longitudinal direction (X-direction in FIG. 15) be determined as well.

The exemplary embodiment of the scanning instrument 1 described here is suited in particular to function as a mobile or even portable device. Thus, for instance, a single specimen of the probe can be used for different processing machines. Also, for instance, a quality controller with a mobile scanning instrument can simply and rapidly perform measurements in the workshop at all processing machines.

A mobile probe is advantageous in particular when performing measurements on very large workpieces. However, the invention is not limited to a mobile design; naturally, it is also possible for the instrument to be fixedly arranged on a processing machine, such as, for instance, a turning lathe, drilling machine, computer-controlled lathe or machining center. In the case of a turning lathe, the scanning instrument may, for instance, be arranged on a flexible or swiveling arm, so that the instrument can be rapidly brought into the measuring position. In the case of a machining center, the scanning instrument may, for instance, be fitted on the tool revolver head. Just like a machining tool, the instrument may then be caused to move for performing the measurement.

In operation, for measuring a particular screw thread, first a probe element 12 with a ball 13 of suitable size is selected. For measuring practically all sizes of screw thread occurring in practice, a set of six or seven probe elements is adequate. Once fitted with the appropriate probe element 12, the scanning instrument is calibrated with a calibrated thread gauge that corresponds with the selected probe element.

For the calibration measurement, the probe 1 is so arranged with respect to the thread gauge to be measured, that the longitudinal axes of the probe element and the screw thread extend substantially parallel. Now, the ball 13 is placed on the screw thread and the entire probe element is displaced using a drive motor in the instrument parallel to the screw thread, in the direction designated X in FIG. 15. Since the ball 13 follows the screw threads, the probe element 12 moves in the direction designated Y in FIG. 15, while the displacement data are supplied to, for instance, a computer in the above-described manner.

Once the measuring results have arrived in the processing computer, the measuring values can be compared with the geometry of the thread gauge which is stored in the computer. On the basis of this comparison, the computer determines the relation between measuring values and screw thread profile, so that in a next measurement, the actual geometry can be accurately determined on the basis of the measuring results.

Next, a screw thread of a workpiece is measured. The scanning of the screw thread occurs in accordance with the measurement of the calibration screw thread. Depending on the method of geometry determination, several paths can be measured. The measuring results obtained are then transmitted to the computer, which converts them to profile depth values on the basis of the calibration data.

The computer is equipped with software which is designed for computing the desired geometrical data according to the above-described method. To that end, however, the user must supply the computer with the measuring results of the diameter measurement with another measuring instrument. This can be done, for instance, by inputting a diameter, measured, for instance, with sliding calipers. With the thus obtained measuring data, the computer calculates the desired geometrical data of the measured screw thread, for instance according to the above-described method.

The geometry of the calibration screw thread is known in the processing system. The signal obtained during the calibration measurement is compared with this reference and adjustment factors are determined on the basis thereof. In a next measurement, these factors are used to process the measuring data obtained. By calibrating the scanning instrument in each case prior to a measurement, a highly accurate result is ensured, In particular, this prevents measuring errors that occur as a result of small deficiencies arising in the course of time, for instance in the geometry of the instrument, for instance through wear. What can also be eliminated in this way are measuring errors due to wear or form deficiencies of the measuring ball.

The instrument is preferably provided with a support surface, such as indicated, for instance, at 30 and 31 in FIG. 15, to allow the instrument to be placed firmly and stably against a workpiece for performing a measuring operation.

Although the above description has consistently referred to screw thread, the invention can also be utilized for measuring other, similar grooves.

FORMULAE SHEET I

Modified Formulae for Calculation of Internal Flank Diameter, Based on Berndt $$m = D1 - d_t + XX_1 + XX_2 \quad (1)$$

$$m = D_t - d_t + 2 * XX_1 \quad (2)$$

$$E = m\cos\theta + d_r \frac{\cos\frac{\alpha_1 - \alpha_2}{2}}{\sin\frac{\alpha_1 + \alpha_2}{2}} \sqrt{1 - \left(\frac{m\sin\theta}{d_r\cos\frac{\alpha_1 - \alpha_2}{2}}\right)^2} \quad (3)$$

$$\arcsin\theta_r = \frac{\left(p - \frac{2np\theta}{\pi}\right)\frac{\cos\alpha_1\cos\alpha_2}{\sin(\alpha_1 + \alpha_2)}}{\pi m^2 \cos\frac{\alpha_1 + \alpha_2}{2} \cos\theta_{k-1} + \frac{d_t}{m}\sin\frac{\alpha_1 + \alpha_2}{2}\cos\frac{\alpha_1 - \alpha_2}{2}\sqrt{1 - \left(\frac{m\sin\theta_{k-1}}{d_r\cos\frac{\alpha_1 - \alpha_2}{2}}\right)^2}} \quad (4)$$

$$\theta_1 = \frac{dmp}{\pi m^2} \frac{\cos\alpha_1\cos\alpha_2\cos\frac{\alpha_1 - \alpha_2}{2}}{\cos\frac{\alpha_1 + \alpha_2}{2}} \frac{1}{1 + \frac{d_r}{m}\sin\frac{\alpha_1 + \alpha_2}{2}\cos\frac{\alpha_1 - \alpha_2}{2}} \quad (5)$$

E=flank diameter internal screw thread m=distance between the centers of the scan ball D1=core diameter inteal screw thread xx1=first top-valley displacement measurement scan ball XX2=second top-valley displacement measurement scan ball dt=diameter scan ball α1, α2=flank angles (front flank, rear flank)

p=period n=number of grooves

θ=iteration angle for calculation

FORMULAE SHEET II

Modified Formulae for Calculation of External Flank Diameter, Based on Berndt $$m = d + d_t - xx_1 - xx_2 \quad (6)$$

$$m = d + d_t - 2 * xx_1 \quad (7)$$

-continued $$E = m\cos\theta - d_t \frac{\cos\frac{\alpha_1 - \alpha_2}{2}}{\sin\frac{\alpha_1 + \alpha_2}{2}} \sqrt{1 - \left(\frac{m\sin\theta}{d_t\cos\frac{\alpha_1 - \alpha_2}{2}}\right)^2} + \left(p - \frac{2np\theta}{\pi}\right)\frac{\cos\alpha_1 \cos\alpha_2}{\sin(\alpha_1 + \alpha_2)} \quad (8)$$

$$\arcsin\theta_k = \frac{dmp}{\pi m^2} \frac{\cos\alpha_1 \cos\alpha_2 \cos\frac{\alpha_1 - \alpha_2}{2}}{\cos\frac{\alpha_1 + \alpha_2}{2}} \quad (9)$$

$$\theta_1 = \frac{dmp}{\pi m^2} \frac{\cos\alpha_1 \cos\alpha_2 \cos\frac{\alpha_1 - \alpha_2}{2}}{\cos\frac{\alpha_1 + \alpha_2}{2}} \cdot \frac{\sqrt{1 - \left(\frac{m\sin\theta_{k-1}}{d_r\cos\frac{\alpha_1 - \alpha_2}{2}}\right)^2}}{\cos\theta_{k-1} - \frac{d_t}{m}\sin\frac{\alpha_1 + \alpha_2}{2}\cos\frac{\alpha_1 - \alpha_2}{2}\sqrt{1 - \left(\frac{m\sin\theta_{k-1}}{d_r\cos\frac{\alpha_1 - \alpha_2}{2}}\right)^2}} \cdot \frac{1}{1 - \frac{d_t}{m}\sin\frac{\alpha_1 + \alpha_2}{2}\cos\frac{\alpha_1 - \alpha_2}{2}} \quad (10)$$

E=flank diameter external screw thread
m =distance between the centers of the scan ball or measuring wire
d=outside diameter external screw thread
xx1=first top-valley displacement measurment scan ball or measuring wire
xx2=second top-valley displacement measurement scan ball or measuring wire
dt=diameter scan ball or measuring wire
α1, α2=flank angles (front flank, rear flank)
P=period
n=number of grooves
θ=iteration angle for calculation

What is claimed is:

1. A method for determining one or more geometric parameters of an axial cross section of internal or external screw thread over at least one complete period, the method comprising:
    scanning two screw thread profiles located diametrically opposite each other, the two screw thread profiles located in a plane through, a centerline of the screw thread;
    generating two scanning result signals representative of the two scanned screw thread profiles; and
    associating the two scanning result signals in a processing device according to at least one linked measurement of a suitable intermediate parameter to determine desired geometrical data about a measured screw thread.

2. The method for determining one or more geometric parameters according to claim 1, wherein the geometric parameter to be determined is a flank diameter of an internal or external screw thread, the method further comprising:
    determining from each of the scanning result signals:
        a position of a reference axis, which reference axis intersects each screw thread profile of the scanning result signal at a position representing precisely 0% material and 100% air;
        a position of a flank diameter line in each of the screw thread profiles, which flank diameter line extends parallel to the reference axis of each of the screw thread profiles and which flank diameter line intersects each screw thread profile of the scanning result signal at a position representing 50% material, and 50% air; and
        an offset distance between the reference axis and the flank diameter line;
    computing the flank diameter through combination of the offset distances of the two screw thread profiles and the at least one linked measurement.

3. The method for determining one or more geometric parameters according to claim 1, wherein the geometric parameter to be determined is a core diameter of an external screw thread, the method comprising:
    determining from each of the scanning result signals;
        a position of a reference axis, which reference axis intersects each screw thread profile of the scanning result signal at a position representing precisely 0% material and 100% air;
        a position of a core diameter line in each of the screw thread profiles, which core diameter line extends parallel to the reference axis of the screw thread profiles and which core diameter line intersects each screw thread profile at a position representing precisely 100% material and 0% air; and
        an offset distance between the reference axis and the core diameter line;
    computing the core diameter through combination of the offset distances of the two screw thread profiles and the at least one linked measurement.

4. The method for determining one or more geometric parameters according to claim 1, wherein the parameter to be determined is the outside diameter in a thread of an internal screw thread, the method further comprising:
    determining from each of the scanning result signals;
        a position of a reference axis, which reference axis intersects each screw thread profile of the scanning result signal at a position representing precisely 0% material and 100% air;
        a position of a outside diameter line in each of the screw thread profiles, which outside diameter line extends parallel to the reference axis of the screw thread profiles and which outside diameter line intersects each screw thread profile at a position representing, precisely 100% material and 0% air; and
        an offset distance between the reference axis and the outside diameter line;
    computing the outside diameter through combination of the offset distances of the two screw thread profiles and the at least one linked measurement.

5. The method for determining one or more geometric parameters according to claim 1, wherein the suitable intermediate parameter is a core diameter to measure an internal thread.

6. The method for determining one or more geometric parameters according to claim 1, wherein the suitable intermediate parameter is an outside diameter to measure an external thread.

7. The method for determining one or more geometric parameters according to claim 1, the method further comprising:
    digitizing the two signals using an analog to digital converter prior to associating the two signals.

8. The method for determining one or more geometric parameters according to claim 7, the method further comprising:

amplifying the two signals prior to digitizing the two signals.

9. The method for determining one or more geometric parameters according to claim 1, the method further comprising:
   amplifying the two signals in an amplifier circuit prior to associating the two signals.

10. A method for determining an axial cross section of internal or external screw thread, the method comprising:
   performing two top-valley measurements of the screw thread profile at two diametrically opposite positions with a measuring wire or measuring ball;
   generating two top-valley signals representative of the two top-valley measurements; and
   associating the two top-valley signals in a processing device according to at least one linked measurement of a suitable intermediate parameter to compute desired geometrical data about the screw thread.

11. The method for determining one or more geometric parameters according to claim 10, wherein the suitable intermediate parameter is a core diameter to measure an internal thread.

12. The method for detaining one or more geometric parameters according to claim 10, wherein the suitable intermediate parameter is an outside diameter to measure an external thread.

13. A method for determining the flank diameter in a thread of internal or external screw thread, the method comprising:
   scanning a screw thread profile;
   generating a scanning result signal representative of the scanned screw thread profile;
   determining from the scanning result signal:
      a position of a reference axis, which reference axis intersects the screw thread profile of the scanning result signal at a position representing precisely 0% material and 100% air;
      a position of a flank diameter line in the screw thread profile, which flank diameter line extends parallel to the reference axis of the screw thread profile and which flank diameter line intersects the screw thread profile at a position representing 50% material and 50% air; and
      an offset distance between the reference axis and the flank diameter line;
   assuming that a workpiece has been manufactured with a concentricity such that an opposite screw thread profile located diametrically opposite the selected position has a substantially identical profile to the scanned screw thread profile; and
   computing the flank diameter through combination of the offset distance of the selected position, the assumed substantially identical profile of the opposite screw thread profile, and at least one linked measurement.

14. A method for determining the core diameter in a thread of external screw thread, the method comprising:
   scanning a screw thread profile;
   generating a scanning result signal representative of the scanned screw thread profile;
   determining from the scanning result signal:
      a position of a reference axis, which reference axis intersects the screw thread profile of the scanning result signal at a position representing precisely 0% material and 100% air;
      a position of a core diameter line in the screw thread profile, which core diameter line extends parallel to the reference axis of the screw thread profile and which core diameter line intersects the screw thread profile at a position representing precisely 100% material and 0% air; and
      an offset distance between the reference axis and the core diameter line;
   assuming that a workpiece has been manufactured with a concentricity such that an opposite screw thread profile located diametrically opposite the selected position has a substantially identical profile to the scanned screw thread profile; and
   computing the core diameter through combination of the offset distance of the selected position, the assumed substantially identical profile of the opposite screw thread profile, and at least one linked measurement.

15. A method for determining the outside diameter in a thread of internal screw thread, the method comprising:
   scanning a screw thread profile;
   generating a scanning result signal representative of the scanned screw thread profile;
   determining from the scanning result signal:
      a position of a reference axis, which reference axis intersects the screw thread profile of the scanning result signal at a position representing precisely 0% material and 100% air;
      a position of a outside diameter line in the screw thread profile, which outside diameter line extends parallel to the reference axis of the screw thread profile and which outside diameter line intersects the screw thread profile at a position representing precisely 100% material and 0% air; and
      an offset distance between the reference axis and the outside diameter line;
   assuming that a workpiece has been manufactured with a concentricity such that an opposite screw thread profile located diametrically opposite the selected position has a substantially identical profile to the scanned screw thread profile; and
   computing the outside diameter through combination of the offset distance of the selected position, the assumed substantially identical profile of the opposite screw thread profile, and at least one linked measurement.

16. A method for scanning a screw thread profile comprising:
   providing a scanning device for scanning a screw thread profile, the scanning device comprising:
      a housing;
      a measuring arm having a scanning element on a first end, the measuring arm pivotally connected to the housing on a second end;
   moving the measuring arm along an internal or external screw thread profile;
   detecting deflection of the scanning element during moving and thereby generating a detected deflection signal; and
   using the detected deflection signal to compute with a process device one or more geometric parameters of an axial cross section of the screw thread profile.

17. The method for scanning a screw thread profile according to claim 16, wherein the measuring arm has a slidable connection to the housing so as to be slidable in a longitudinal direction of the measuring arm;
   wherein the moving act comprises:
      sliding the measuring arm in tie longitudinal direction of the measuring arm.

18. The method for scanning a screw thread profile according to claim 16 wherein the measuring arm is connected to the housing through at least one leaf spring, via a straight guide integrated into the housing;

wherein the moving act comprises:

flexing the leaf spring.

19. The method for scanning a screw thread profile according to claim 18, wherein the detecting act is performed with at least one strain gauge provided on the leaf spring.

20. The method for scanning a screw thread profile according to claim 17, wherein the sliding act comprises:

displacing a counterweight actively connected with the measuring arm responsively to the sliding of the measuring arm.

21. The method for scanning a screw thread profile according, to claim 20, wherein the counterweight is connected with the measuring arm via a transmission construction, and wherein sliding of the measuring arm in the longitudinal direction displaces the counterweight longitudinally in the opposite direction.

22. A method for scanning a screw thread profile according to claim 16, further comprising:

transmitting detected deflection with a communication device operatively attached to the housing.

23. The method for scanning a screw thread profile according to claim 22, wherein the transmitting act comprises:

transmitting data using an infrared signal with an infrared transmitter operatively attached to the housing.

24. The method for scanning a screw thread profile according to claim 16, wherein the using detected deflection act comprises:

processing data of detected deflection with a processing machine operatively attached to the housing to thereby communicate one or more geometric parameters of an axial cross section of screw thread.

25. The method for scanning a screw thread profile according to claim 16, wherein detecting deflection of the scanning element comprises:

sensing a continuous electrical signal represenative of the deflection of the scanning element;

amplifying the continuous electrical signal; and digitizing the continuous electrical signal to create a digital signal representative of forces experienced by the scanning element.

26. A method for scanning a screw thread profile, the method comprising:

providing a scanning device comprising:

a housing;

a measuring arm mounted to the housing through a leaf spring; and at least one strain gauge provided on the leaf spring;

running the measuring arm over a surface of a screw thread, the measuring arm experiencing forces relative to the screw thread; and sensing, an electrical signal generated by the strain gauge in response to the forces experienced by the measuring, the electrical signal representative of the screw thread profile.

* * * * *

UNITED STATES PATENT AND TRADEMARK OFFICE
CERTIFICATE OF CORRECTION

PATENT NO.    : 6,289,595 B1
DATED         : September 18, 2001
INVENTOR(S)   : Reginald Galestien It is certified that error appears in the above-identified patent and that said Letters Patent is hereby corrected as shown below:

Column 1,
Line 15, delete "BP", insert -- EP --
Line 39, delete "198", insert -- 196 --

Column 3,
Line 13, delete "595", insert -- 995 --
Line 24, delete "0,89,500", insert -- 0,589,500 --

Column 4,
Line 39, delete "1001", insert -- 100% --

Column 5,
Line 44, delete "di", insert -- d1 --

Column 6,
Line 55, delete "o0", insert -- of --

Column 7,
Line 38, delete "14can", insert -- 14 can --

Column 8,
Line 39, delete "14is", insert -- 14 is --

Column 10,
Lines 24, 25, 30 and 36, delete "$d_r$", insert -- $d_t$ --
Line 29 and 38, delete "dnp", insert -- $d_t$np --

UNITED STATES PATENT AND TRADEMARK OFFICE
CERTIFICATE OF CORRECTION

PATENT NO.    : 6,289,595 B1
DATED         : September 18, 2001
INVENTOR(S)   : Reginald Galestien It is certified that error appears in the above-identified patent and that said Letters Patent is hereby corrected as shown below:

Column 14,
Line 66, delete "tie", insert -- the --.

Column 16,
Line 25, after "measuring", insert -- arm --

Signed and Sealed this

Twenty-fifth Day of June, 2002

Attest:

JAMES E. ROGAN
Director of the United States Patent and Trademark Office

Attesting Officer